Jan. 12, 1965     D. R. SWAN     3,165,674
ELECTRICAL TESTING APPARATUS
Filed Aug. 9, 1962     6 Sheets-Sheet 1

INVENTOR.
DEAN R. SWAN
BY
*Russell; Chittick & Pfund*
ATTORNEYS

INVENTOR.
DEAN R. SWAN

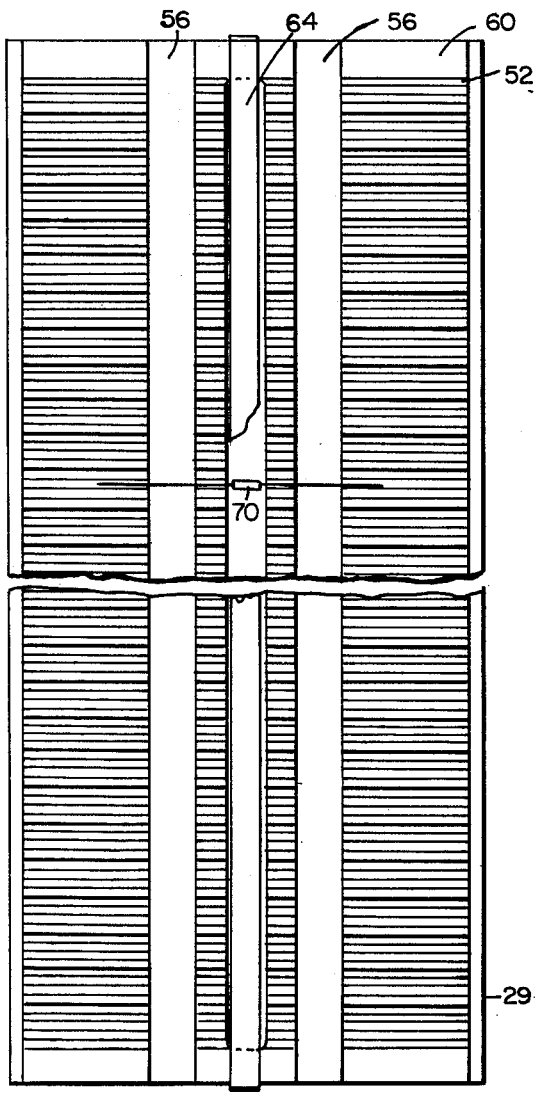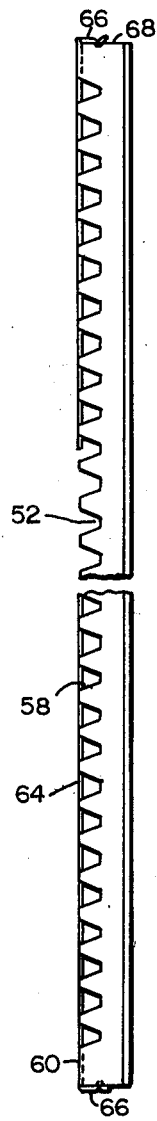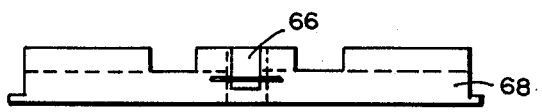
FIG.7
FIG.8
FIG.9

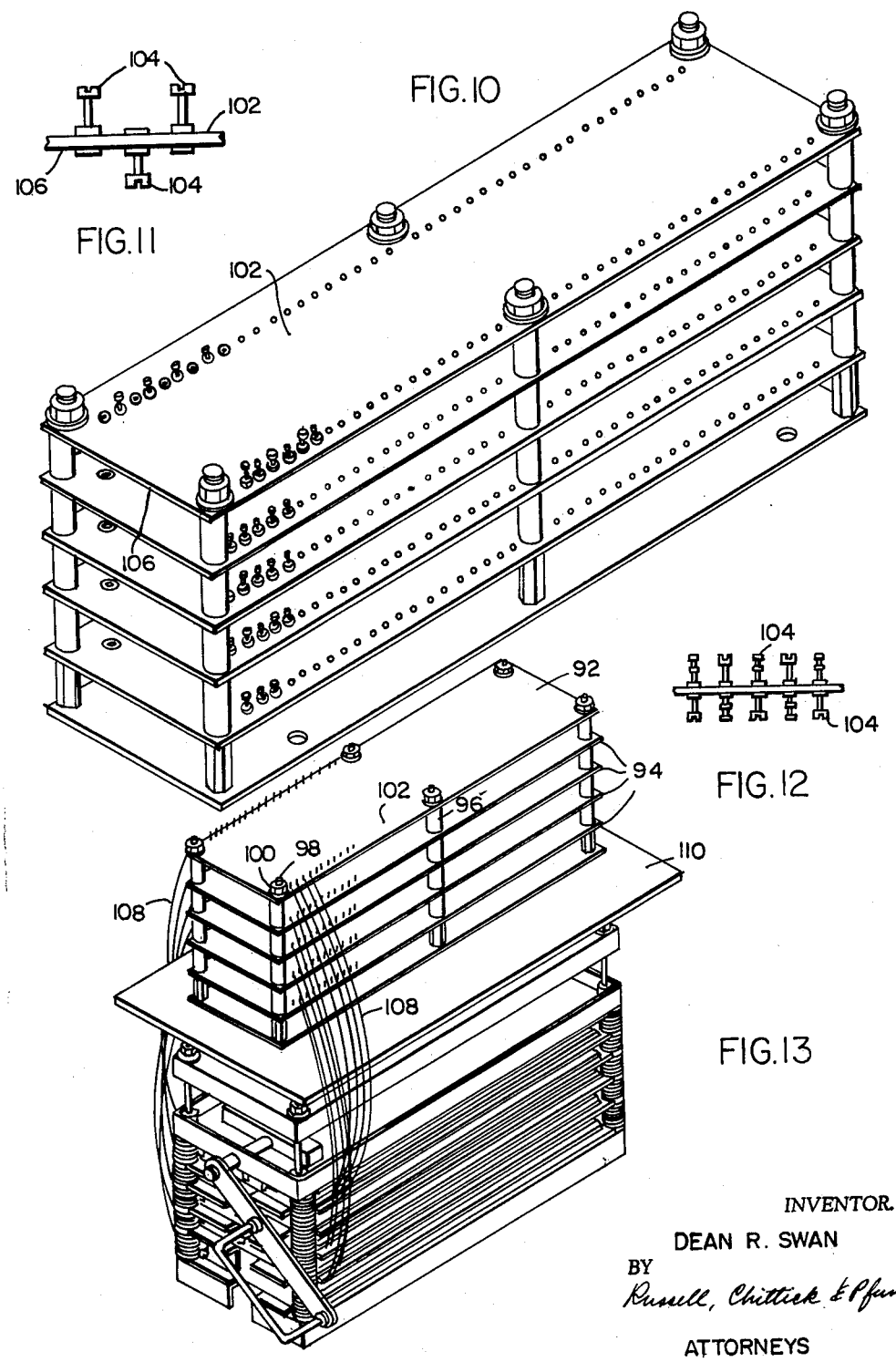

Jan. 12, 1965   D. R. SWAN   3,165,674
ELECTRICAL TESTING APPARATUS
Filed Aug. 9, 1962   6 Sheets-Sheet 6
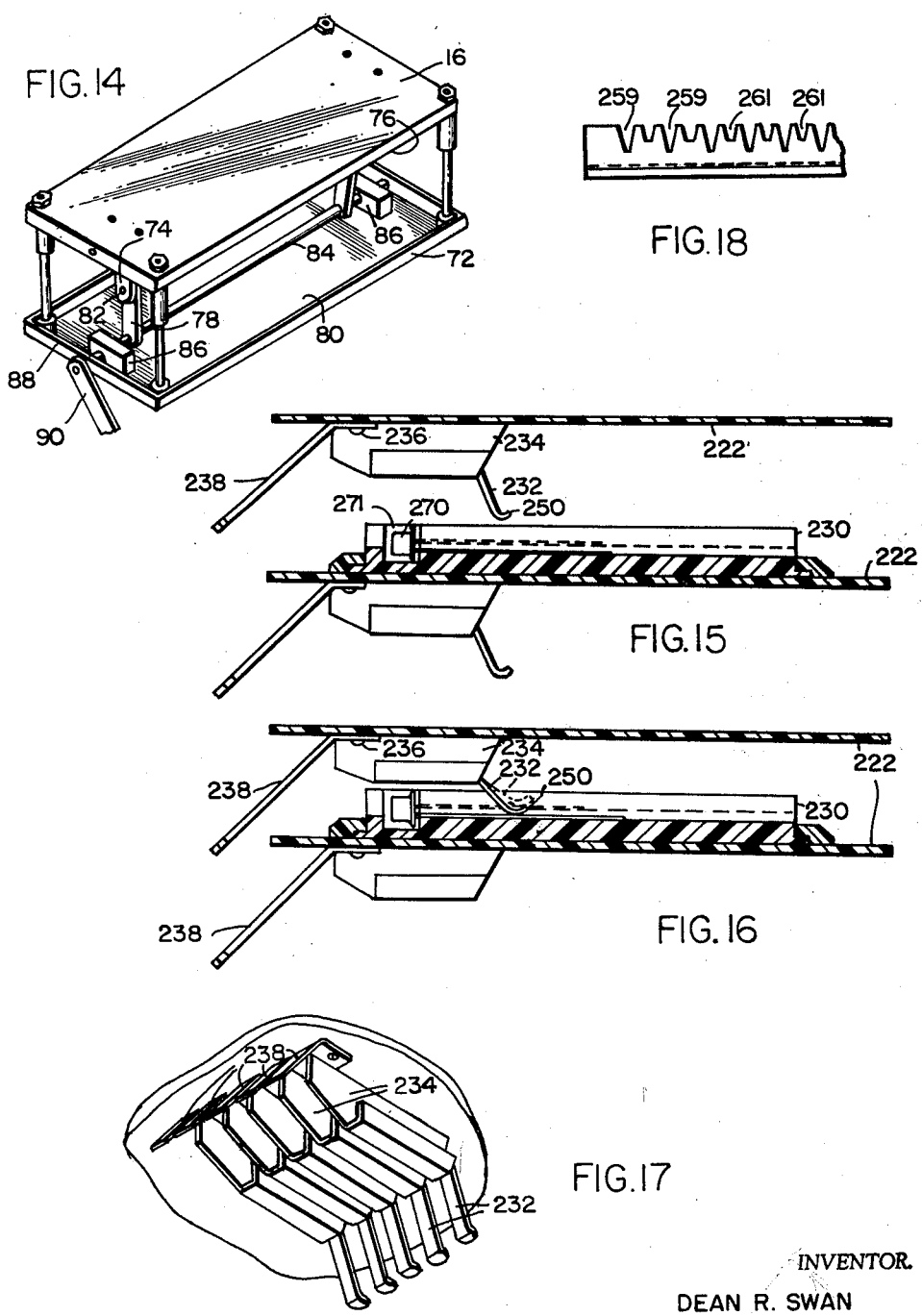
INVENTOR.
DEAN R. SWAN
BY
Russell, Chittick & Pfund
ATTORNEYS

United States Patent Office 3,165,674
Patented Jan. 12, 1965

---

3,165,674
ELECTRICAL TESTING APPARATUS
Dean R. Swan, Andover, Mass., assignor to Precision Metal Products Co., Inc., Stoneham, Mass., a corporation of Massachusetts
Filed Aug. 9, 1962, Ser. No. 215,836
6 Claims. (Cl. 317—101)

This invention relates generally to electrical test equipment and specifically to an apparatus for the testing of large groups of electronic components such as rectifiers, capacitors, resistors, semiconductors or the like, in their normal operating environment or under simulated extreme temperature conditions.

In the manufacture or assembly of electronic components, it is necessary that the characteristics of each unit conform to stated specifications. It is therefore essential that components be individually tested to determine their characteristics. It has been found that one of the most effective tests to gauge the values of these characteristics is a projected life test wherein the components are tested for periods of 24 hours. This is commonly referred to as a "burn-in" testing procedure. Each individual component is manually tested by causing current to flow and taking readings on a meter.

Additionally, due to recent advances in the miniaturization of circuity, arrangements of circuits have often been compacted into small areas where there are no facilities for dissipating the heat generated. It thus becomes extremely important to determine the characteristics of these components when they are subjected to extreme temperature conditions.

Due to the large quantity of electronic components being produced today to meet the requirements of a rapidly growing electronics industry, a definite need has developed for testing equipment on which multiples of components can be tested simultaneously in their shipping trays thereby eliminating manual handling and its tendency to injure the delicate component leads. Furthermore, where large groups of components are to be tested, manual attachment of the external leads to a current source and to an external meter is laborious and time consuming.

Therefore, it is an object of this invention to provide an apparatus capable of establishing simultaneous contact with a plurality of electronic components so as to enable electrical characteristics to be measured.

It is a further object of this invention to provide an electrical contact making apparatus in which uniform contact pressure is applied to each of the individual components.

It is a further object of this invention to provide an electrical contact making apparatus which will test large groups of electronic components in their shipping trays yet effectively dissipate the heat which is generated.

It is another object of this invention to provide an electrical contact making apparatus in which electrical contact may be established simply and quickly between the component leads and the power source and which will remain in this state for sustained periods of time.

It is another object of this invention to provide electrical testing apparatus in which electrical contact may be made simultaneously to a large group of components by the actuation of a single control lever.

It is another object of this invention to provide compartmented trays adapted to maintain components in an aligned separated condition for testing and shipping purposes.

It is another object of this invention to provide electrical testing apparatus in which components may be subjected to extreme environmental conditions.

It is another object of this invention to provide an electrical testing apparatus in which a plurality of components can be scan tested before and after a sustained life test.

Broadly stated, the combined features of this invention constitute an electrical testing apparatus which will accommodate stacked layers of component shipping trays containing a plurality of aligned electronic components between alternate banks of resilient wiper contacts which may be compressed so as to maintain contact with the component leads thereby allowing the flow of electrical energy from an outside source.

To the accomplishment of the foregoing related ends, the present invention then consists of the means hereinafter fully described and particularly pointed out in the claims, the annexed drawing and the following description setting forth in detail certain means by which to carry out the invention, such disclosed means illustrating, however, but one of the various ways in which the principle of the invention may be employed.

In the drawings:

FIG. 7 is a top plan view of the component shipping tray.

FIG. 8 is a view in side elevation of the component shipping tray.

FIG. 9 is a view in front elevation of the component shipping tray.

FIG. 10 is a view in perspective of the resistor bank jig.

FIG. 11 is an enlarged view of the resistor contacts.

FIG. 12 is an enlarged view of modified resistor contacts.

FIG. 13 is a view in perspective of the resistor bank jig positioned atop the electrical testing apparatus with the resistors electrically connected to the electronic components.

FIG. 14 is a view in perspective of the test apparatus illustrating the locking features.

FIG. 15 is a view in section of a modified form of this invention in the open position.

FIG. 16 is a view in section of the modified form of this invention in the closed position.

FIG. 17 is a view in perspective partly broken away of the wiper contacts.

FIG. 18 is a view in side elevation partly broken away of a modified form of the component tray.

Figure 1:
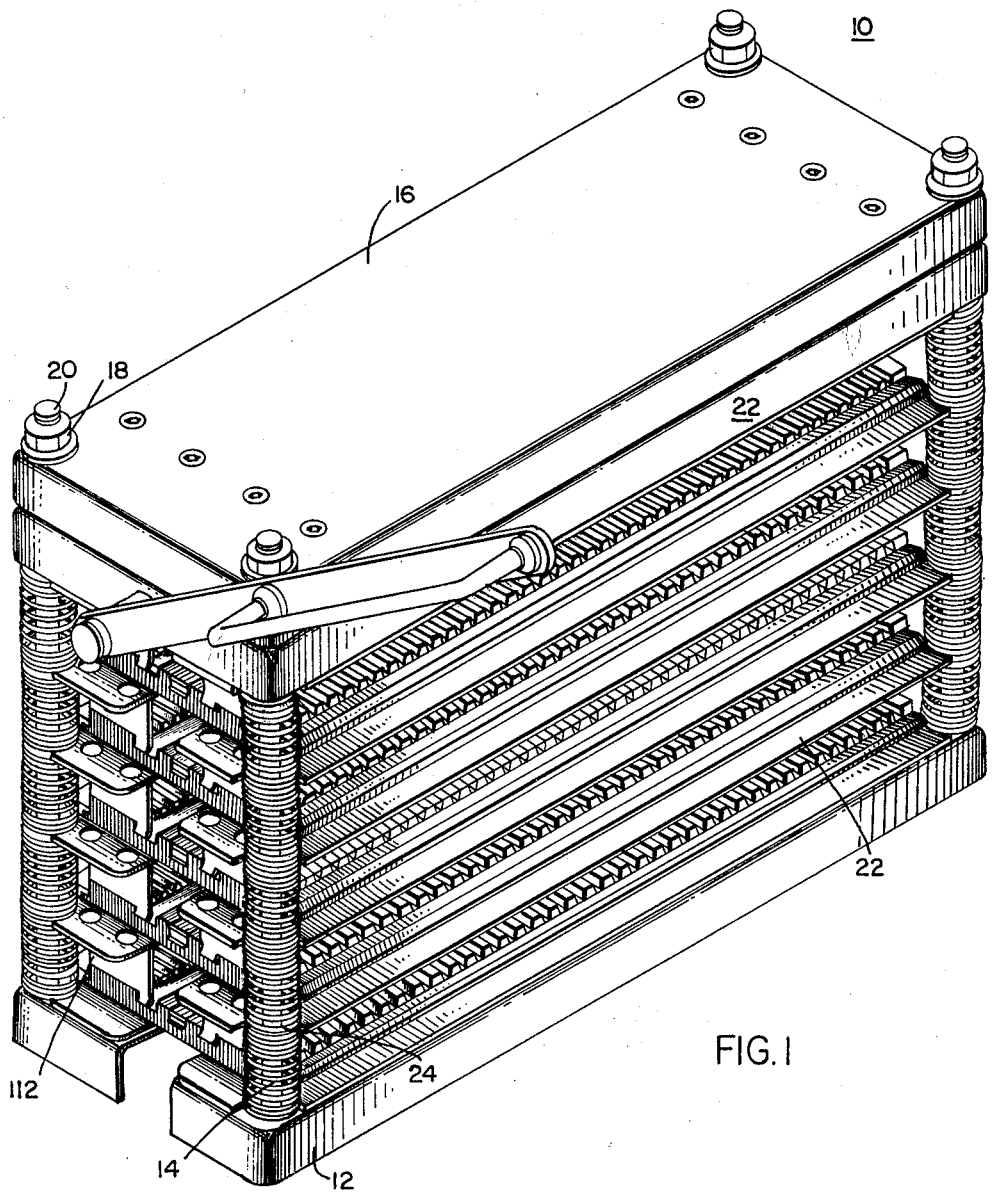
FIG. 1 is a view in perspective of the electrical testing apparatus of this invention with a plurality of vertically stacked component trays containing components inserted therein, with the apparatus being in the uncompressed state.

Reference is now made to the drawings, wherein an illustrated embodiment of the electrical testing apparatus made in accordance with the present invention and generally designated by the reference numeral 10 is shown. The essential elements of the electrical testing apparatus 10 include a rectilinear base plate 12 and vertical guide posts 14 extending upwardly from the four base plate corners. A cover plate 16 is positioned on the guide posts 14 and secured thereto by nut members 18 which are in engagement with the threads 20 of the guide posts 14.

Positioned about the guide posts 14 and supported thereon are a plurality of rectilinear shelf plates 22 which are maintained in spaced relation to each other by a plurality of coil springs 24 mounted concentric with the guide posts 14.

Figure 3:
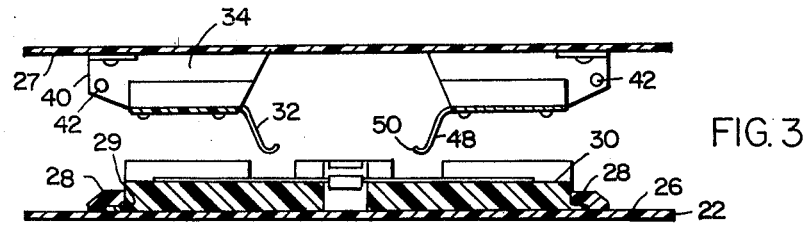
FIG. 3 is a view in front elevation partly in section, of one bank of resilient wiper contacts positioned over a component tray.
Figure 4:
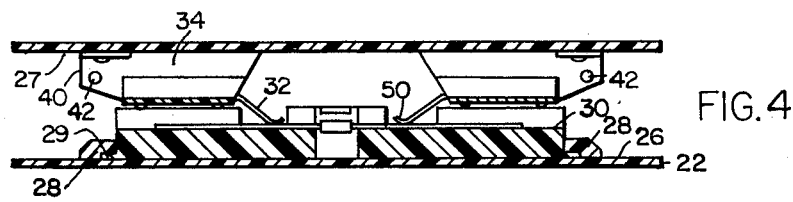
FIG. 4 is a view in front elevation partly in section similar to FIG. 3 illustrating the bank of resilient wiper contacts compressed into engagement with the components leads.
Figure 5:
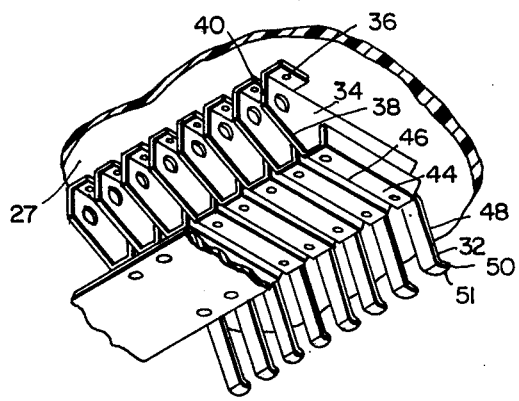
FIG. 5 is a view in perspective partly broken away illustrating the thermal fins and the wiper contacts.
Figure 6:
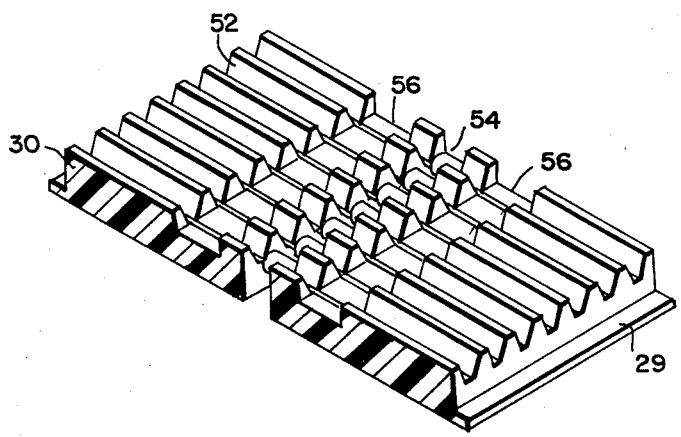
FIG. 6 is a view in perspective broken away of the component shipping tray.

Referring to FIG. 3, the upper surface 26 of shelf plate 22 has a pair of longitudinally extending flange members 28 which are adapted to cooperate with the side edges 29 of the component tray 30 in a manner to be subsequently described more fully. The lower surfaces 27 of shelf plates 22 have a plurality of longitudinally aligned downwardly depending wiper contacts 32 which are spaced from the lower surfaces 27 of the shelf plates 22 by bracket members 34 which are riveted or secured to the the undersurface of the shelf plates 22 by attaching members 36. Each of the bracket members 34 include radially extending fins 38 which are longitudinally spaced from each other to allow a flow of air therebetween. Adjacent the edges 40 of the fins 38 are formed apertures 42 which are adapted to secure leads extending from an external source. As illustrated in FIG. 3, there are two longitudinal rows of facing brackets 34, each bracket having a downwardly depending wiper contact 32. Each of the wiper contacts 32 comprise a laterally extending portion 44 having one edge 46 secured to the bracket 34, a downwardly depending portion 48 with the tip 50 formed into an arcuate surface 51.

In FIGS. 6 through 9 there is illustrated a component tray 30 which is adapted for use with testing apparatus 10. Component tray 30 is formed of an insulating material such as silicon glass which is highly resistant to heat deformation. A series of longitudinally aligned laterally extending grooves 52 is formed in the tray which is bifurcated by a longitudinally extending central well 54. Equally spaced from and disposed on either side of the central well 54 is a pair of longitudinally extending scanning grooves 56. As illustrated in FIG. 8, the walls 58 define grooves 52 which extend downwardly from the top surface 60 of the component tray 30. Each of the trays 30 is provided with a longitudinally extending clip member 64 which is adapted to snap over the central well 54 so that the end portion 66 of clip member 64 will cooperate with the end portion 68 of the component tray 30 to retain a plurality of components 70 within the grooves 52 of the tray 30.

Figure 2:
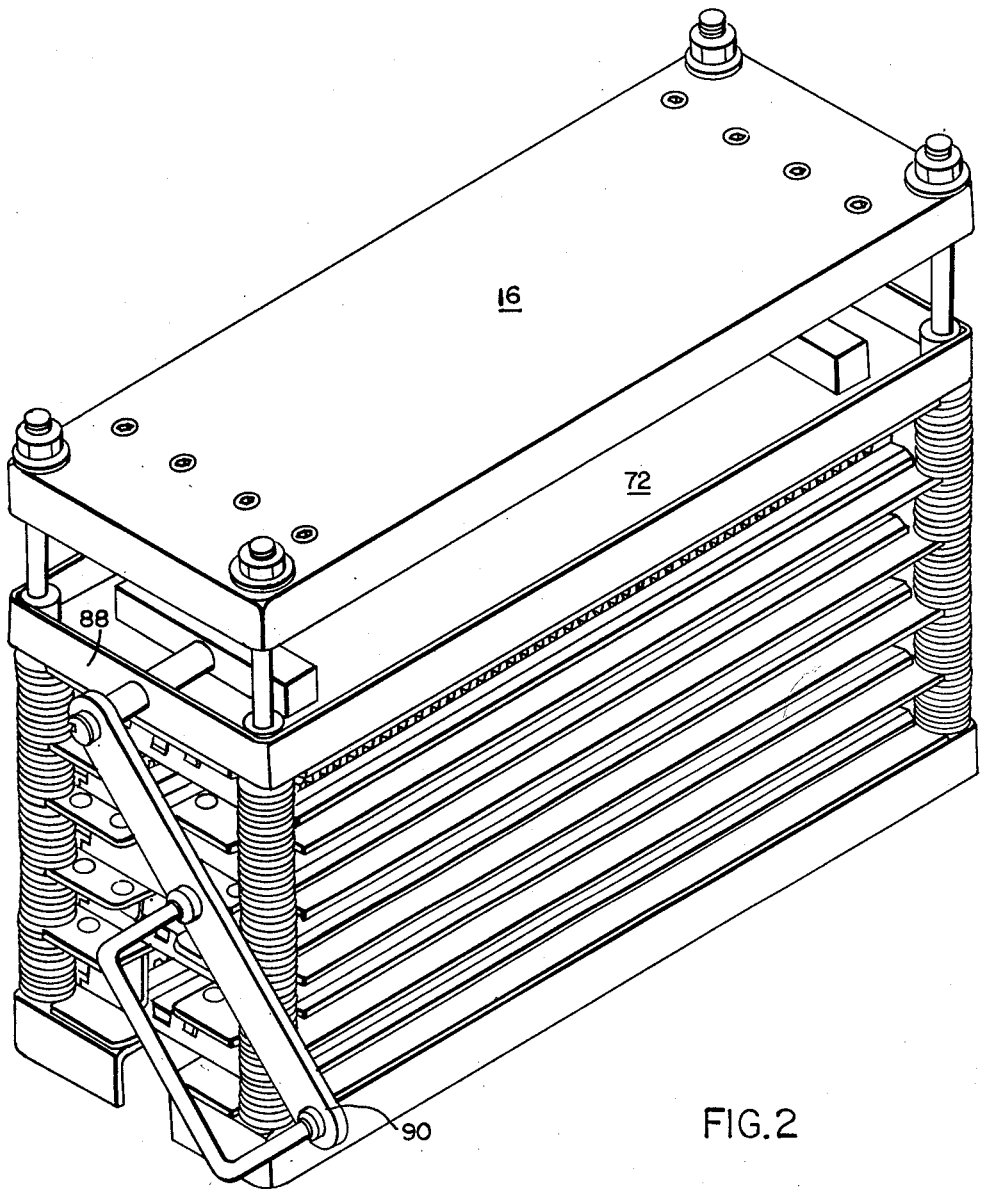
FIG. 2 is a view in perspective similar to FIG. 1 with the apparatus in its compressed state.

Referring to FIGS. 2 and 14, there is illustrated a compression plate 72 which is disposed intermediate the cover plate 16 and the uppermost shelf plate 22. The compression plate 72 has a rectilinear configuration and is supported by and adapted for axial movement along the guide posts 14 in a manner similar to the shelf plates 22. As shown in FIG. 14, an upper link member 74 is pivotally secured to the undersurface 76 of the cover plate 16 so as to extend angularly downward therefrom. A lower link member 78 extends angularly upward from the upper surface 80 of the compression plate 72. The free ends of each pair of link members are joined together by a pivot pin 82. The lower link member 78 is keyed to a longitudinally extending shaft 84 which is supported on the upper surface 80 of the compression plate 72 by a pair of bearing blocks 86. Another set of link members is longitudinally spaced from the first set and is similarly attached to the cover plate 16 and keyed to the longitudinally extending shaft 84. The shaft 84 extends outwardly through the front wall 88 of the compression plate 72 and has an angularly extending operating lever 90 keyed thereto.

As illustrated in FIGS. 10 through 13, a testing jig 92 is adapted for use with the electrical test apparatus 10 to provide a suitable means of emplacing a plurality of resistors or the like in the electrical line between the units being tested and the recording meter. The testing jig 92 comprises a plurality of stacked decks 94 which are vertically spaced from each other and maintained in this spaced relation by spacer members 96 positioned on vertically extending shafts or supports 98. The stacked decks 94 are held in assembly by nut members 100 which are in threaded engagement with the upper ends of the shafts 98. As illustrated in FIGS. 10 and 11, the upper surface 102 and lower surface 106 of each of the decks 94 have a plurality of longitudinally aligned laterally spaced terminal posts 104 to provide a means for securing a plurality of longitudinally aligned resistors. Electrical leads 108 extend downwardly from the terminal posts 104 and are engaged in the apertures 42 of brackets 34. FIG. 13 illustrates the relative position of the testing jig 92 positioned on thermal insulated support 110 which prevents the heat generated by the resistors positioned on the testing jig from radiating downward and affecting the characteristics of the units being tested on plate members 22.

In the operation of the apparatus, a plurality of components 70 are positioned in the laterally extending grooves 52 of trays 30 so that the lead wires extend into the grooves 52 with the main body of the component 70 lying within the central groove 54. The component trays 30 are inserted at various levels of the apparatus engaging the shelf plates 22. This is accomplished by sliding the side edges 29 of the component tray 30 beneath and between facing flange members 28. This aligns the longitudinal grooves 52 under the downwardly depending wiper contacts 32. Tray guides 112 extend forwardly from one edge of the shelf plates 22 to prevent tilting of the component trays 30 during insertion and to eliminate possible damage to the downwardly depending wiper contacts 32. Stop members not shown are positioned on each of the upper surfaces of the shelf plates 22 to provide a means for longitudinal alignment of the component trays 30 thus positioning each of the grooves 52 directly beneath a pair of downwardly depending wiper contacts 32. With all of the component trays 30 arranged in stacked relationship within the apparatus, the lever 90 is rotated downwardly imparting a rotary motion to the longitudinally extending shaft 84 which causes the link members 74 and 78 to move so as to attain a straight vertical alignment and remain locked in that position. In this manner the compression plate 72 is forced away from the cover plate 16 compressing the coil springs 24. The shelf plates 22 are forced downwardly so that the wiper contacts 32 enter into a wiping and sliding engagement with the component leads 70 which lie disposed within the grooves 52. The wiper contacts 32 are formed of a resilient material. Therefore, the resistance offered to their downward movement by the lead wires 108 of the components 70 results in their flexing which causes the arcuate surfaces 51 to slide inwardly thus effecting a good electrical contact with the lead wires 108. Electrical energy is allowed to flow through the lead wires 108 which extend from the resistor jig 92 through the wiper contacts 32 and through each of the components 70 to a suitable recording meter (not shown).

A modified form of the invention is illustrated in FIGS. 15–18. The modified form is adapted for testing components having leads extending from only one end thereof.

In FIG. 15, the apparatus is shown in open position with shelf plate 222 disposed above component tray 230. Components 270 are arrayed within tray 230. A plurality of wiper contacts 232 depend downwardly from the undersurface of the shelf plates 222 having upwardly inclined end portions 250. The wiper contacts 232 are secured to the shelf plates 222 by brackets 234 which are integral therewith. Extending laterally outward from the edge of the brackets 234 are fins 238 which are secured to the undersurface of the shelf plates 222 by attaching members 236. The fins 238 in this modified form are inclined downwardly at an angle to provide a conduit for the passage of cooling air as shown in FIG. 16.

In FIGS. 15, 16 and 18 there is shown a modified form of the component tray 230 which consists primarily of a heat resistant material such as silicon glass or the like. The laterally extending grooves 259 are separated from each other by similar grooves 261 which are cut to a different depth to accommodate the third lead of the component 270. Individual well portions 271 are formed at one side of component tray 230 to accommodate the components 270.

In operation the modified form of the invention is similar to the basic form. The trays 230 have a plurality of the components 270 disposed within the wells 271 with their leads resting in the grooves 259 and 261. The component trays 230 are positioned on the shelf plates 222. Upon compression of the shelf plates 222, the wiper contacts 232 enter into a wiping and sliding engagement with the leads which are positioned within the grooves 259 and 261. Electrical energy is allowed to flow through the wiper contacts 232 so as to complete the circuit through the components 270 and suitable readings are taken on an external meter (not shown).

Referring again to the preferred form of the invention, the testing procedure is continued for a specified period of time and at the completion thereof the wiper contacts 32 are disconnected from the leads of the components 70 by releasing the locking action of the link members 74 and 78. This is accomplished by means of a counter-clockwise rotation of the lever 90. The release of the locking action allows the springs 24 to raise the compression plate 72 and each of the shelf plates 22 upwardly away from the component trays 30 to provide an adequate clearance for the trays 30 to be withdrawn from the testing apparatus.

As is shown in FIG. 7, a pair of scanning grooves 56 are formed in each of the component trays 30 to provide a relatively simple guideway along with the leads of an electrical testing instrument may be passed so as to quickly detect components which have failed during the testing period.

It will readily become apparent to one skilled in the art that the provision of the fins 38 on the undersurface of the shelf plates 22 ensures the existence of an air space between the upper surface of the component trays 30 and the undersurface of the shelf plates 22. By providing this air space, an adequate amount of cooling air is allowed to flow laterally across the upper surface of the components 70 during the testing period which effectively conveys away any undesirable heat that would have an effect upon the accuracy of the test. This air cooling action is of even more importance when the components are tested under extreme temperature conditions. Temperatures are raised to 250 to 300 degrees centigrade. With this level of heating, lateral circulation of air is facilitated by the provision of the fins 38 which maintain a clearance between the undersurface of the shelf plates 22 and the component trays 30.

Upon completion of the test the components 70 are retained within the trays 30. The clip members 64 remain snapped over the tray ends 68 facilitating the shipment of the tray unit to a storage area or directly to the customer without the individual handling of the components 70.

Since certain other obvious modifications may be made in the device without departing from the scope of the invention, it is intended that all matter contained herein be interpreted in an illustrative and not in a limiting sense.

I claim:
1. An electrical testing apparatus comprising: a base plate; guide posts mounted in said base plate and extending upwardly therefrom; a cover plate overlying said base plate and secured to the top ends of said guide posts; a plurality of shelf plates horizontally disposed between said base plate and said cover plate, said shelf plates connected to and vertically movable on said guide posts; spring means co-axially carried on said guide posts for resiliently spacing said shelf plates from each other; component trays removably mounted upon the upper surfaces of said shelf plates, each said tray having aligned grooves in which a multiplicity of electrical components are carried and fastening means for retaining the components in said tray grooves; a multiplicity of wiper contacts mounted on and depending from the lower surfaces of said shelf plates; each said wiper contact positioned over a groove in said component tray; a compression plate horizontally disposed between said uppermost shelf plate and said cover plate, said compression plate connected to and vertically movable on said guide posts; and means for driving said compression plate downward to bring said wiper contacts into electrical contact with the tray-held components whereby the components can be electrically tested.

2. Apparatus of claim 1 wherein said driving means includes a linkage operating shaft mounted between said cover plate and said compression plate and an actuating lever therefor whereby a single throw of said lever establishes electrical contact between said wiper contacts and the electrical components.

3. Apparatus of claim 1 wherein said component tray and associated fastening means is independently useable as a shipping container.

4. Apparatus of claim 1 wherein said wiper contacts have thermal fins formed integral therewith for rapid dissipation of heat.

5. Apparatus of claim 1 wherein each said shelf plate is maintained at an equal distance from its upper and lower adjacent shelf plates by said spring means, and wherein said equal distance is quantitatively varied by said driving means.

6. Apparatus of claim 1 wherein said shelf plates have guide slots, and said component trays have corresponding flanges for slidable mounting on said shelf plates.

References Cited by the Examiner
UNITED STATES PATENTS

| | | | |
|---|---|---|---|
| 2,293,127 | 8/42 | Fishack et al. | 339—18 |
| 2,603,683 | 7/52 | Armbraster et al. | 174—59 |
| 2,802,189 | 8/57 | Bishop et al. | 339—18 |
| 2,918,648 | 12/59 | Ludman et al. | 324—158 |
| 3,058,440 | 10/62 | Berry | 339—17 |

JOHN F. BURNS, *Primary Examiner.*